(12) United States Patent
Shmilovich et al.

(10) Patent No.: US 7,669,785 B2
(45) Date of Patent: Mar. 2, 2010

(54) INTEGRATED ENGINE EXHAUST SYSTEMS AND METHODS FOR DRAG AND THERMAL STRESS REDUCTION

(75) Inventors: Arvin Shmilovich, Huntington Beach, CA (US); Yoram Yadlin, Irvine, CA (US); David M. Smith, Santa Ana, CA (US); Roger W. Clark, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 944 days.

(21) Appl. No.: 11/379,971

(22) Filed: Apr. 24, 2006

(65) Prior Publication Data

US 2007/0246604 A1    Oct. 25, 2007

(51) Int. Cl.
*B63H 11/10* (2006.01)
(52) U.S. Cl. ............... 239/265.19; 239/265.43; 244/73 R; 60/771
(58) Field of Classification Search ............ 244/73 R, 244/55, 130, 129.1; 60/770, 771, 226.1; 239/265.11, 265.19, 265.27, 265.25, 265.43
See application file for complete search history.

(56) References Cited

U.S. PATENT DOCUMENTS

| | | | |
|---|---|---|---|
| 2,658,333 A | 11/1953 | Smialowski | |
| 3,007,304 A * | 11/1961 | Wotton et al. | 239/265.43 |
| 3,442,471 A | 5/1969 | Fischer et al. | |
| 3,971,534 A | 7/1976 | Grotz | |
| 4,000,610 A | 1/1977 | Nash et al. | |
| 4,000,611 A | 1/1977 | McCardle, Jr. et al. | |
| 4,068,469 A * | 1/1978 | Adamson | 60/204 |
| 5,653,406 A | 8/1997 | Amano et al. | |

(Continued)

FOREIGN PATENT DOCUMENTS

EP    1367249 A1    12/2003

(Continued)

OTHER PUBLICATIONS

Decher et al, "Systems Aspects of Engine Installation," The Aerothermodynamics of Aircraft Gas Turbine Engines, Jul. 1978, pp. 26-1 to 26-4 and 26-38 to 26-74.

(Continued)

*Primary Examiner*—Michael Carone
*Assistant Examiner*—Benjamin P Lee
(74) *Attorney, Agent, or Firm*—Lee & Hayes, PLLC (57) ABSTRACT

Integrated engine exhaust systems and methods for reducing drag and thermal loads are disclosed. In one embodiment, a propulsion system includes an engine installation configured to be mounted on a wing assembly of an aircraft. The engine installation includes an engine, and an exhaust system operatively coupled to the engine. The exhaust system includes at least one nozzle configured to exhaust an exhaust flow from the engine. The nozzle includes a variable portion configured to vary an exit aperture of the nozzle from a first shape to a second shape to change a flowfield shape of at least a portion of the nozzle flowfield proximate the wing assembly, thereby reducing at least one of drag and thermal loading on the wing assembly. In a further embodiment, the exhaust system includes an inner nozzle that exhausts a core exhaust flow, and an outer nozzle that exhausts a secondary exhaust flow, the outer nozzle having the variable portion configured to vary the exit aperture of the outer nozzle.

12 Claims, 6 Drawing Sheets

U.S. PATENT DOCUMENTS

| | | | | |
|---|---|---|---|---|
| 6,082,635 | A * | 7/2000 | Seiner et al. | 239/265.19 |
| 6,360,528 | B1 * | 3/2002 | Brausch et al. | 60/262 |
| 6,532,729 | B2 * | 3/2003 | Martens | 60/204 |
| 6,705,547 | B2 * | 3/2004 | Braga Da Costa Campos | 239/265.33 |
| 6,718,752 | B2 * | 4/2004 | Nesbitt et al. | 60/204 |
| 7,004,047 | B2 | 2/2006 | Rey et al. | |
| 7,093,423 | B2 * | 8/2006 | Gowda et al. | 60/204 |
| 7,178,338 | B2 * | 2/2007 | Whurr | 60/771 |
| 7,216,831 | B2 * | 5/2007 | Wood | 244/99.8 |
| 7,340,883 | B2 * | 3/2008 | Wood et al. | 60/226.1 |
| 7,458,221 | B1 * | 12/2008 | Arnold et al. | 60/771 |
| 2002/0125340 | A1 * | 9/2002 | Birch et al. | 239/265.11 |
| 2003/0231777 | A1 * | 12/2003 | Butler et al. | 381/71.3 |
| 2004/0237534 | A1 * | 12/2004 | Webster et al. | 60/771 |
| 2005/0150223 | A1 | 7/2005 | Rey et al. | |
| 2005/0229585 | A1 | 10/2005 | Webster | |

FOREIGN PATENT DOCUMENTS

EP     1482159 A2     12/2004

OTHER PUBLICATIONS

PCT International Search Report and Written Opinion for PCT Application No. PCT/US2007/008696 mailed on Jun. 2, 2008, 14 pgs.

\* cited by examiner

INTEGRATED ENGINE EXHAUST SYSTEMS AND METHODS FOR DRAG AND THERMAL STRESS REDUCTION

FIELD OF THE INVENTION

The present disclosure relates to aircraft propulsion systems, and more specifically, to integrated engine exhaust systems and methods for providing reduced drag and/or thermal stress reduction for an aircraft.

BACKGROUND OF THE INVENTION

Many types of aircraft, including transport aircraft, are equipped with wing-mounted turbofan engines. In this configuration, the exhaust flow from the wing-mounted engines may impinge upon the wing surfaces. Some conventional aircraft may utilize the exhaust flow to augment wing lift during low-speed operations, enabling short field take off and landing capabilities for such aircraft.

Although desirable results have been achieved using existing wing-mounted turbofan engines, there is room for improvement. For example, reduced drag will enable aircraft operation from even shorter airfields. In addition, due to the impingement of the high temperature exhaust on the flap and wing surfaces of some aircraft configurations, these surfaces must be designed to withstand extreme thermal loads. Titanium flaps may be required rather than aluminum flaps to withstand the harsh thermal environment. Generally, these design considerations add weight to the aircraft and increase manufacturing costs. Novel systems that mitigate the weight and cost penalties associated with wing-mounted engines would therefore have utility.

SUMMARY OF THE INVENTION

The present invention is directed to integrated engine exhaust systems and methods for providing lower drag and thermal stress reduction for an aircraft. Embodiments of the present invention may advantageously provide reduced take off and landing distances, reduced aircraft weight, reduced fuel consumption, reduced production and maintenance costs, and reduced noise levels in comparison with the prior art.

In one embodiment, a propulsion system for an aircraft includes an engine installation configured to be mounted on a wing assembly of the aircraft. The engine installation includes an engine, and an exhaust system operatively coupled to the engine. The exhaust system includes at least one nozzle configured to exhaust an exhaust flow from the engine. The nozzle includes a variable portion configured to vary an exit aperture of the nozzle from a first shape to a second shape to change the flowfield shape of at least a portion of the exhaust flowfield proximate the wing assembly to reduce at least one of drag and thermal loading on the wing assembly. In a further embodiment, the exhaust system includes an inner nozzle that exhausts a core exhaust flow, and an outer nozzle that exhausts a secondary exhaust flow, the outer nozzle having the variable portion configured to vary the exit aperture of the outer nozzle.

BRIEF DESCRIPTION OF THE DRAWINGS

Embodiments of the present invention are described in detail below with reference to the following drawings.

DETAILED DESCRIPTION

The present invention relates to integrated engine exhaust systems and methods for providing lower drag and thermal stress reduction for an aircraft. Many specific details of certain embodiments of the invention are set forth in the following description and in FIGS. 1-12 to provide a thorough understanding of such embodiments. The present invention, however, may have additional embodiments, or may be practiced without one or more of the details described below.

Integrated engine exhaust systems and methods in accordance with the invention may reduce the aerodynamic drag, weight, and production and maintenance costs of aircraft having coupled propulsion and high-lift (or powered-lift) systems. In general, embodiments of the present invention use a variable shape fan exhaust nozzle to control exhaust flow field shape during operation. The resulting exhaust flowfield (including one or both of an outer flowfield and an inner flowfield) affects the wing spanload, resulting in less induced drag and reduced thermal stresses on the wing assembly in comparison with prior art systems.

Figure 1:
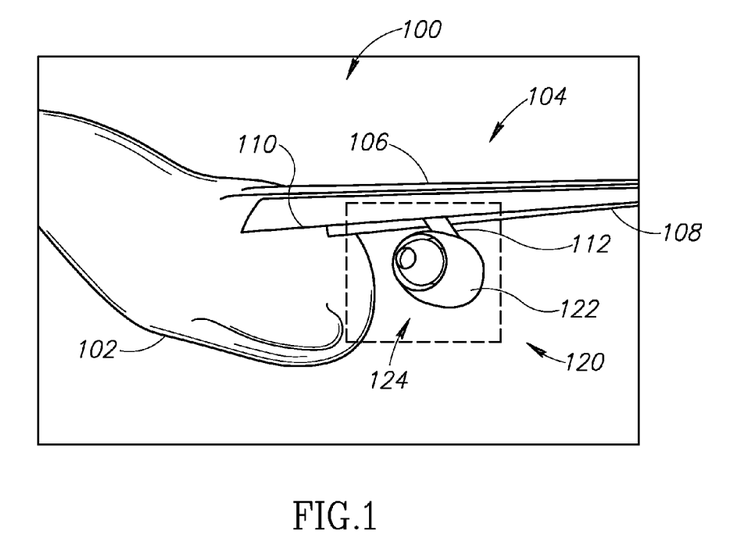
FIG. 1 is a partial isometric view of an aircraft in accordance with an embodiment of the invention.

FIG. 1 is a partial isometric view of an aircraft 100 in accordance with an embodiment of the invention. The aircraft 100 includes a fuselage 102 and a wing assembly 104 that includes a main wing portion 106. A slat portion 108 extends along a leading edge of the main wing portion 106, and a flap portion 110 extends along a trailing edge of the main wing portion 106.

The aircraft 100 further includes an engine installation 120 coupled to the wing assembly 104 by a pylon 112. The engine installation 120 includes an engine nacelle 122, and an exhaust system 124 situated at a downstream (or aft) end portion of the engine installation 120. Any suitable turbofan engines may be employed, including, for example, those engines manufactured by General Electric of Fairfield, Conn., Pratt & Whitney of East Hartford, Conn., and Rolls-Royce of London, U.K.

Figure 2:
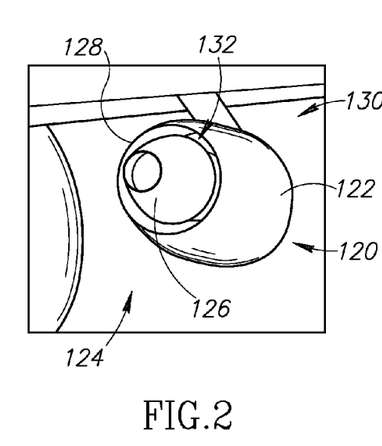
FIG. 2 is an enlarged isometric view of an exhaust system of the aircraft of FIG. 1 operating in a conventional mode of operation.

FIG. 2 is an enlarged isometric view of the exhaust system 124 of FIG. 1. The exhaust system 124 includes an elongated inner nozzle 126 configured to exhaust a core exhaust flow from a combustor portion of the engine installation 120, and a relatively-shorter outer nozzle 128 disposed about the inner nozzle 126 and located proximate a trailing edge portion of the engine nacelle 122. The outer nozzle 128 is configured to exhaust a relatively-cooler fan flow passing through the engine installation 120. This type of nozzle is referred to as a separate flow nozzle. A mixed flow nozzle (not shown) is configured opposite, the inner core nozzle is short, and the fan nozzle is long. The core nozzle is buried inside of the outer fan nozzle. The embodiment of this invention would also be applicable to a mixed flow nozzle.

The outer nozzle 128 is further configured to be controllably adjusted to provide changes in the shape of its exit aperture. For example, as shown in FIG. 2, in a conventional mode of operation 130, the outer nozzle 128 has a circular-shaped exit aperture. In cooperation with the outer surface of the inner nozzle 126, the outer nozzle 128 forms an annular-shaped nozzle exit 132 for exhausting the fan flow in the conventional mode of operation 130.

Figure 3:
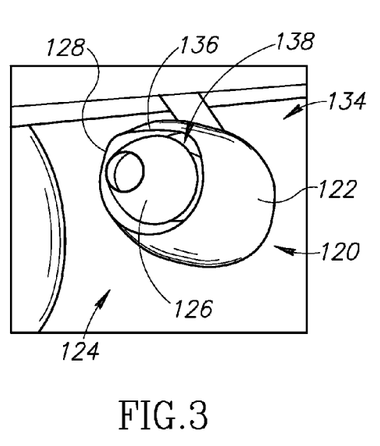
FIG. 3 is an enlarged isometric view of an exhaust system of the aircraft of FIG. 1 operating in a representative non-conventional mode of operation in accordance with an embodiment of the invention.

In accordance with embodiments of the present invention, the shape of the exit aperture of the outer nozzle 128 may be adjusted to a non-circular shape. FIG. 3 shows the exhaust system 120 in a non-conventional mode of operation 134. In this embodiment, the exit aperture of the outer nozzle 128 includes a flattened upper portion 136, while the remainder of the exit aperture is modified such that the exit area is the same as the exit area of the conventional nozzle. Keeping the area of the exit aperture of the non-conventional nozzle the same as that of the conventional engine ensures similar engine thrust levels and maintain engine cycle compatability. Thus, the inner and outer nozzles 126, 128 cooperatively form a non-annular nozzle exit 138 for exhausting the fan flow in the non-conventional mode of operation 134. In one particular embodiment, for example, in the non-conventional mode of operation 134, a separation distance between the inner nozzle 126 and the flattened upper portion 136 of the outer nozzle 128 is reduced to one-half (50%) of the corresponding separation distance between the inner and outer nozzles 126, 128 in the conventional mode of operation 130.

The outer nozzle 128 may employ a variety of mechanisms to achieve the desired variation in shape of the exit aperture. For example, in one embodiment, the outer nozzle 128 includes a plurality of flaps which collectively form the exit aperture. The flaps may be controllably adjusted by a set of actuators that enable the exit aperture of the outer nozzle 128 to be adjusted to a non-circular shape. The plurality of flaps may be controllably actuated by any known means, including hydraulic, electric, or shape-memory-alloy (SMA) actuation. More specifically, the plurality of flaps and associated actuation systems of the outer nozzle 128 may include, for example, any of those systems and methods generally disclosed in U.S. Pat. No. 7,004,047 B2 issued to Rey et al., U.S. Pat. No. 5,893,518 issued to Bruchez et al., U.S. Pat. No. 5,245,823 issued to Barcza, U.S. Pat. No. 4,994,660 issued to Hauer, U.S. Pat. No. 4,245,787 issued to Freid, U.S. Pat. No. 4,000,610 issued to Nash et al., and in published U.S. patent application Ser. No. 11/014,232 by Webster, and U.S. patent application Ser. No. 11/049,920 by Rey et al.

Figure 4:
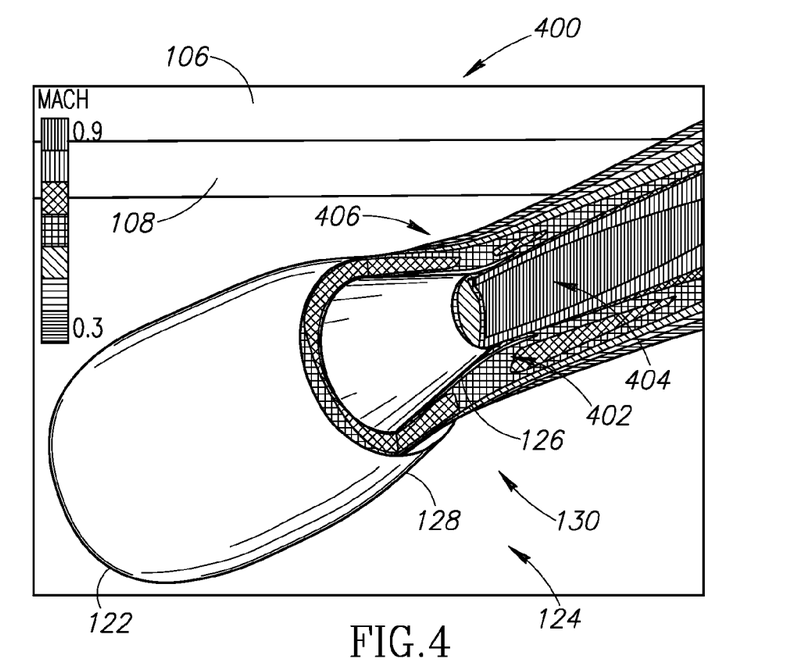
FIG. 4 is an isometric view of the exhaust system operating in the conventional mode of operation as shown in FIG. 2 including a cutaway view of an exhaust flowfield.

FIG. 4 is an isometric view of the exhaust system 124 operating in the conventional mode of operation 130 (FIG. 2), including a cutaway view of an exhaust flowfield 400. In the conventional mode of operation 130, the exit aperture of the outer nozzle 128 is circular, and the exhaust flowfield 400 is generally axisymmetric. An annularly-shaped fan flow 402 emanates from the outer nozzle 128 and is disposed about a central, approximately axisymmetric core flow 404 that emanates from the inner nozzle 126.

Figure 5:
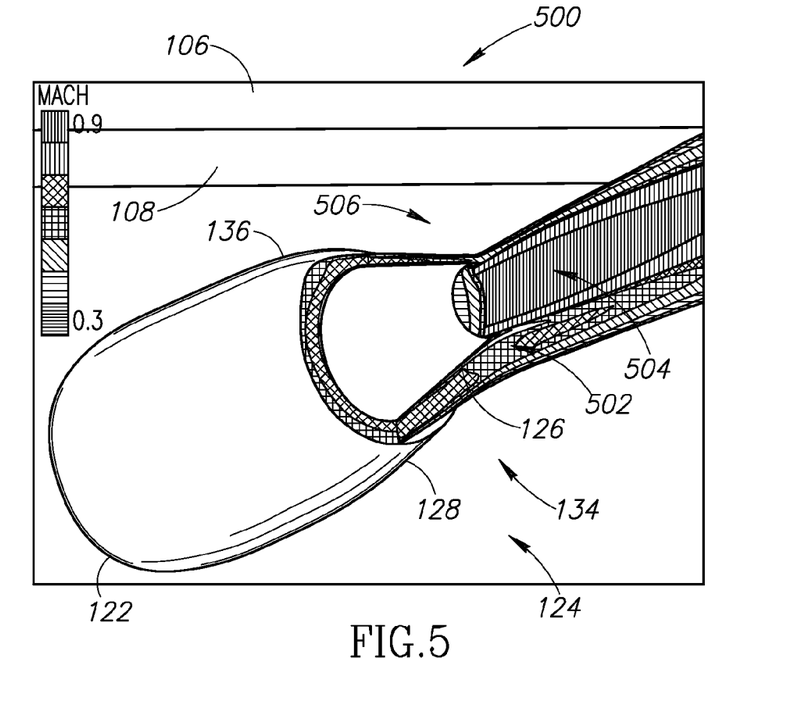
FIG. 5 is an isometric view of the exhaust system operating in the non-conventional mode of operation as shown in FIG. 3 including a cutaway view of the exhaust flowfield.

For comparison, FIG. 5 is an isometric view of the exhaust system 124 operating in the non-conventional mode of operation 134 (FIG. 3), including a cutaway view of an exhaust flowfield 500. In the non-conventional mode of operation 134, the exit aperture of the outer nozzle 128 is non-circular and includes the flattened upper portion 136. Consequently, the exhaust flowfield 500 is non-axisymmetric with a non-annular fan flow 502 emanating from the outer nozzle 128 and disposed about an approximately axisymmetric core flow 504 emanating from the inner nozzle 126. As shown in FIG. 5, an upper portion 506 of the non-conventional exhaust flowfield 500 is varied in shape and less concentrated than a comparable upper portion 406 of the axisymmetric, conventional exhaust flowfield 400 shown in FIG. 4.

Figure 6:
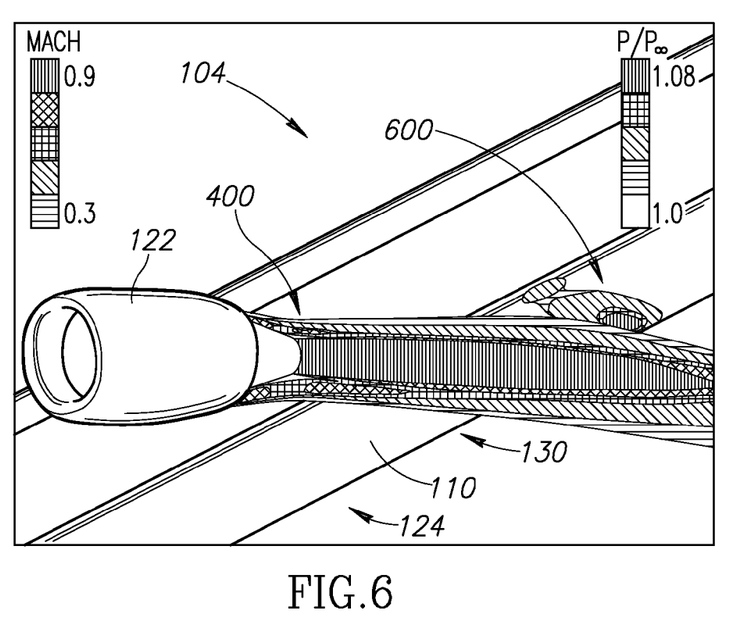
FIG. 6 is an isometric view of the exhaust flowfield of FIG. 4 and an impingement pattern on a wing assembly for the exhaust system operating in the conventional mode of operation.
Figure 7:
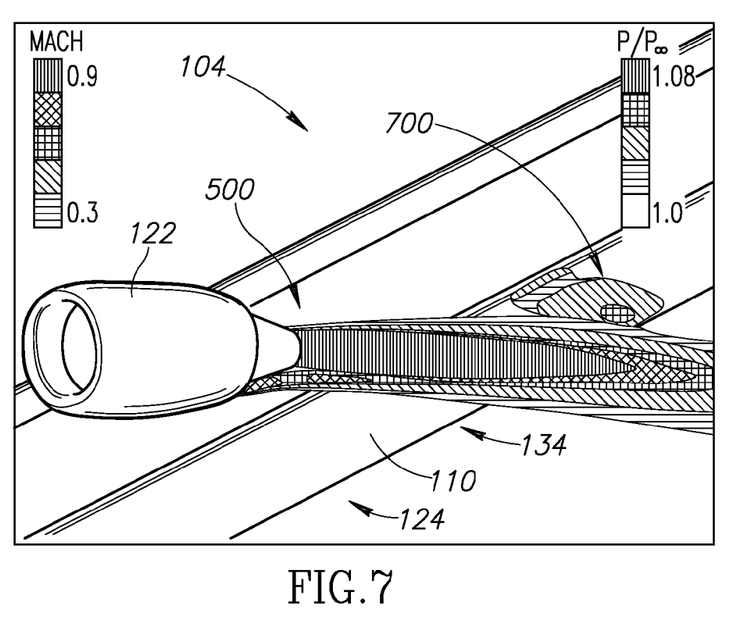
FIG. 7 is an isometric view of the exhaust flowfield of FIG. 5 and an impingement pattern on the wing assembly for the exhaust system operating in the representative non-conventional mode of operation.

FIG. 6 is an isometric view of the exhaust flowfield (shown by Mach number) 400 of FIG. 4, and a pressure distribution 600 on the wing assembly 104, for the exhaust system 124 operating in the conventional mode of operation 130 (FIG. 2). Similarly, FIG. 7 is an isometric view of the exhaust flowfield (shown by Mach number) 500 (FIG. 5) and pressure distribution 700 for the exhaust system 124 operating in the non-conventional mode of operation 134 (FIG. 3). Comparison of the pressure distributions 600, 700 shown in FIGS. 6 and 7 shows that in the non-conventional mode of operation 134, the exhaust flowfield 500 results in a more uniform pressure distribution on the wing flap 110 of the wing assembly 104 in comparison with the conventional exhaust flowfield 400. More specifically, in this embodiment, the pressure distribution 600 for the conventional mode of operation 130 (FIG. 6) is marked by a relatively concentrated pressure pattern having a central, relatively-higher peak pressure value (shown as a central dark region). On the other hand, the pressure distribution 700 for the non-conventional mode of operation 134 exhibits a relatively less-concentrated pressure pattern with a relatively-lower peak pressure value (shown as a central, relatively-lighter region). Consequently, there is a smoother spanload distribution and a reduction in induced drag on the wing assembly 104 in the non-conventional mode of operation 134.

Figure 8:
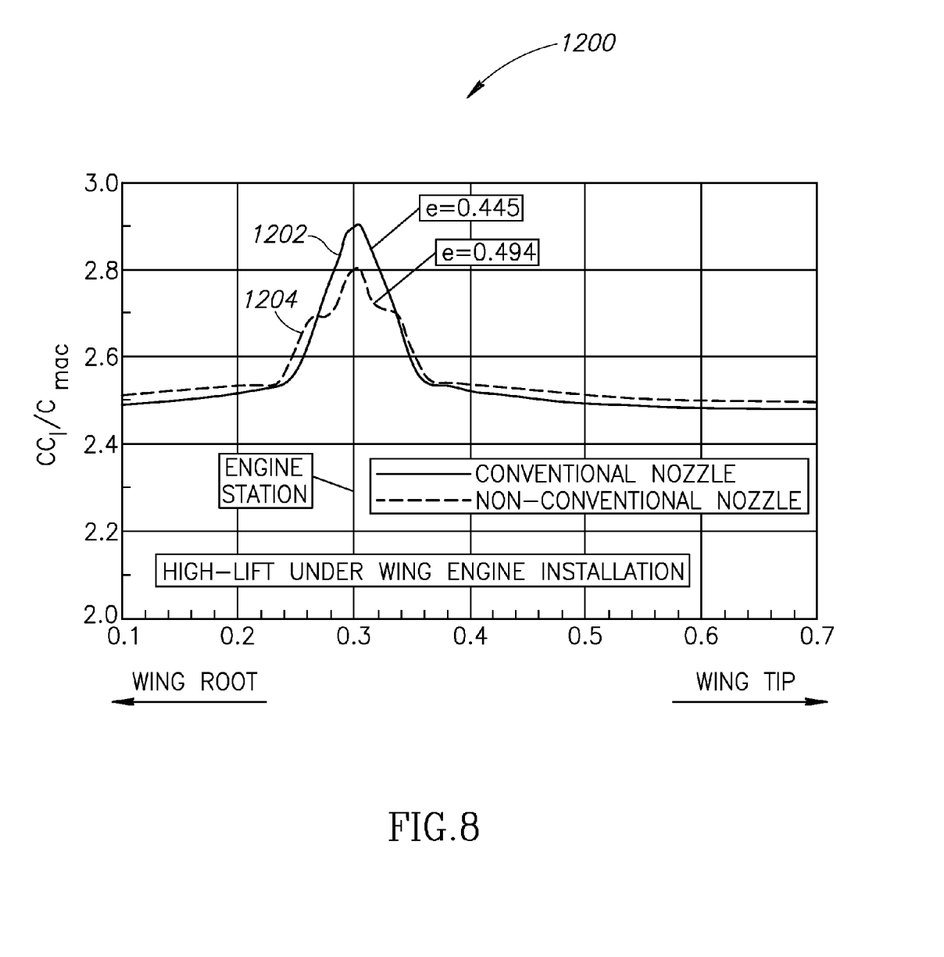
FIG. 8 shows the effect of engine exhaust on span load distribution in accordance with an embodiment of the invention.

FIG. 8 shows the effect of variation of the shape of the engine exhaust on span load distribution in accordance with an embodiment of the invention. More specifically, FIG. 8 shows a graph 1200 of sectional lift versus spanwise position along the wing. A first lift distribution 1202 shows predicted drag data (in terms of the Oswald efficiency factor "e") for the exhaust system 124 operating in the conventional mode of operation 130 (FIG. 2), and a second load distribution 1204 shows predicted drag data for the exhaust system 124 operating in the non-conventional mode of operation 134 (FIG. 3). As shown in FIG. 8, the non-conventional mode of operation 134 provides a more favorable load distribution than the conventional mode of operation 130 due to its relatively less-concentrated pressure pattern with a relatively-lower peak pressure value. For a twin engine aircraft, the predicted aerodynamic efficiency due to the variable fan exhaust increases by about 10% relative to the conventional axisymmetric configuration. This efficiency is proportionately related to the induced component of the drag. Thus, a significant reduction in total drag may be realized since the induced drag is the largest component of airplane drag, including during high lift conditions. Proportionately larger gains in aerodynamic efficiency may be realized from a four-engine aircraft. Reduced total drag translates to reduced required engine power, and hence, it leads to shorter take off distance.

Figure 9:
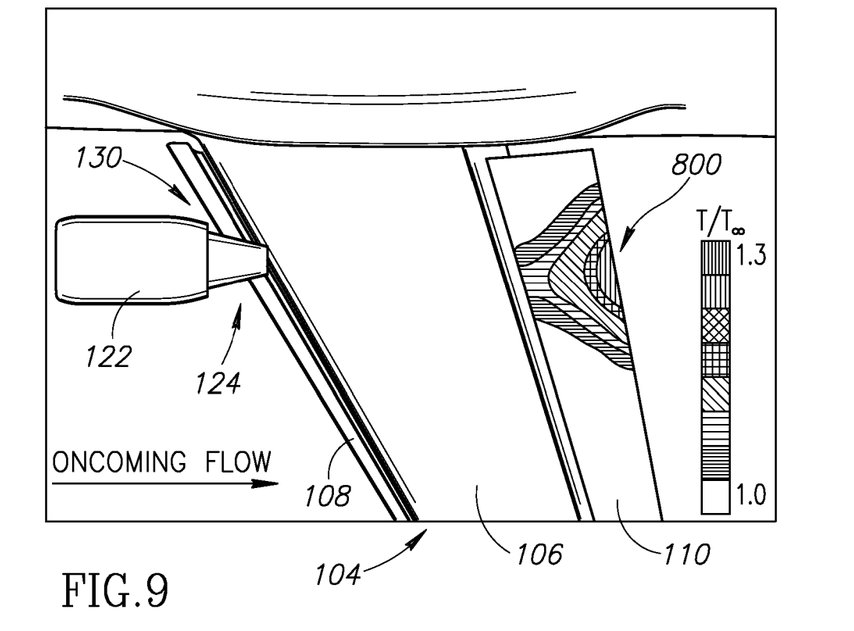
FIG. 9 is a lower elevational view of a wing temperature distribution of the exhaust system operating in the conventional mode of operation as shown in FIG. 2.
Figure 10:
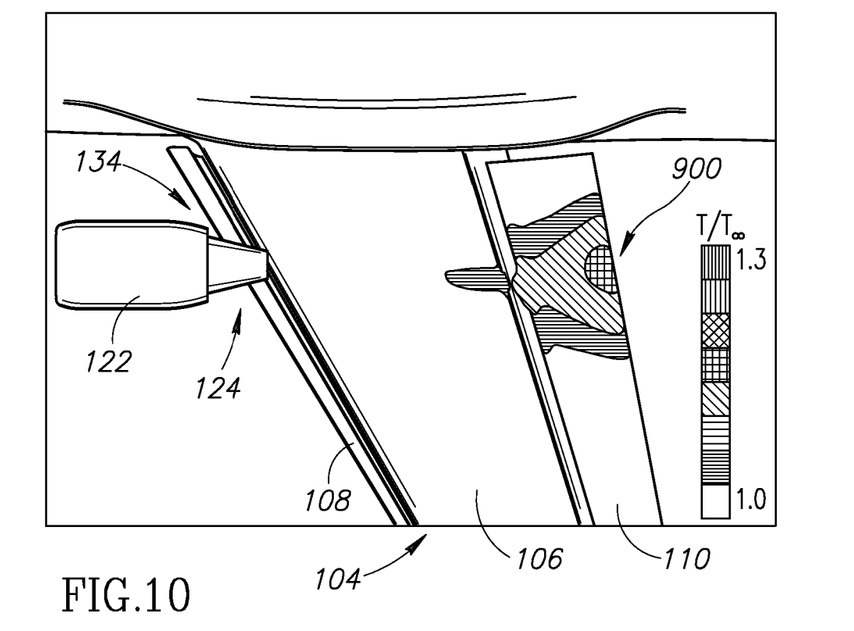
FIG. 10 is a lower elevational view of a wing temperature distribution of the exhaust system operating in the non-conventional mode of operation as shown in FIG. 3.

FIGS. 9 and 10 show wing temperature distributions 800, 900 for the exhaust system 124 operating in conventional and non-conventional modes of operation 130, 134, respectively. Comparison of the wing temperature distributions 800, 900 shown in FIGS. 9 and 10 shows that in the non-conventional mode of operation 134, the exhaust flowfield 500 results in lower temperatures on the wing flap 110 in comparison with the conventional exhaust flowfield 400. More specifically, in this embodiment, the temperature distribution 800 for the conventional mode of operation 130 (FIG. 9) exhibits a relatively concentrated temperature pattern having a central, relatively-higher peak temperature value (shown as a central dark region). On the other hand, the temperature distribution 900 for the non-conventional mode of operation 134 exhibits a relatively less-concentrated temperature pattern with a relatively-lower peak temperature value (shown as a central, relatively-lighter region). Consequently, there is less thermal load on the wing assembly 104 in the non-conventional mode of operation 134.

Embodiments of the invention may provide significant advantages over the prior art. By exploiting the interaction of the non-circular fan exhaust with the surrounding flow passing over the engine nacelle and with the engine core exhaust, embodiments of the invention alter the turbulent mixing of the exhaust flow such that the nozzle flowfield interaction with the wing and flap surfaces results in smoother pressure increment and reduced temperature in comparison with the conventional flowfield impingement. Thus, embodiments of the invention may be used to tune wingspan load distributions, reduce induced drag, enhance jet mixing, and accelerate temperature decay.

The economical and operational impacts of the drag reduction afforded by the present invention may be substantial, and may allow the use of smaller engines or shorter runways. Reduced engine size may, in turn, lead to reduced aircraft weight, reduced fuel consumption, reduced maintenance costs and reduced noise levels. Similarly, the reduction in structural temperature limits may allow the use of aluminum flaps rather than titanium flaps, which leads to reduced production costs and reduced aircraft weight.

It will be appreciated that a variety of alternate embodiments of the invention may be conceived, and that the invention is not limited to the particular embodiments described above. In the following discussion of alternate embodiments, components which remain unchanged from the previously described embodiments are designated with like reference numerals. For the sake of brevity, only substantial structural and operational differences from the previously-discussed embodiments will be described.

Figure 11:
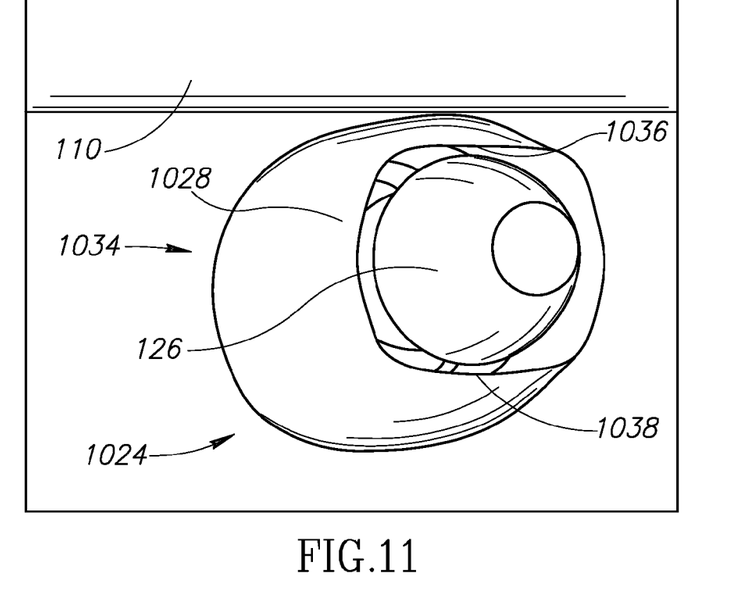
FIGS. 11 and 12 are isometric views of aircraft exhaust systems in accordance with alternate embodiments of the invention.

FIG. 11 shows an isometric view of an aircraft exhaust system 1024 in accordance with an alternate embodiment of the invention. In this embodiment, in a non-conventional operating mode 1034, an outer nozzle 1028 of the exhaust system 1024 includes both a flattened upper portion 1036 and a flattened lower portion 1038. The resulting exit aperture of the outer nozzle 1028 is a non-circular shape disposed about the axisymmetric inner nozzle 126. Consequently, the resulting non-conventional exhaust flowfield (not shown) is varied in shape proximate to the wing assembly, and less concentrated (e.g. having relatively-lower peak pressure and temperature values at the surfaces of the wing assembly 104) than the comparable upper portion 406 of the axisymmetric, conventional exhaust flowfield 400 shown in FIG. 4.

Figure 12:
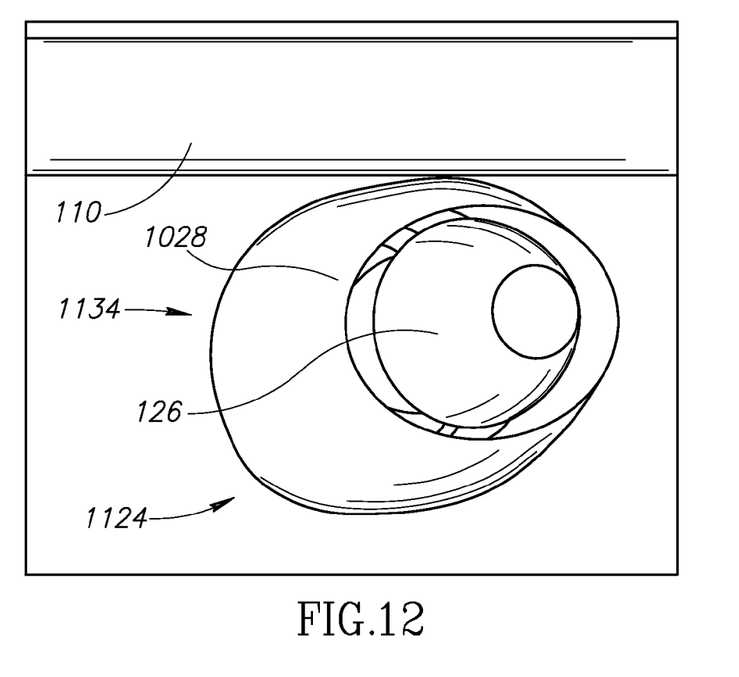

Similarly, FIG. 12 shows an isometric view of an aircraft exhaust system 1124 in accordance with another alternate embodiment of the invention. In a non-conventional operating mode 1134, an outer nozzle 1128 of the exhaust system 1124 is controllably positioned into an approximately elliptical shape with a vertical minor axis. Again, the resulting non-conventional exhaust flowfield (not shown) is varied in shape and less concentrated (e.g. having relatively-lower peak pressure and temperature values at the surfaces of the wing assembly 104) than the comparable upper portion 406 of the axisymmetric, conventional exhaust flowfield 400 shown in FIG. 4. Thus, the advantages of reduced drag and reduced thermal loads, as described more fully above, may be achieved using a variety of alternate exhaust system embodiments.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A propulsion system for an aircraft, comprising:
an engine installation configured to be mounted on a wing assembly of the aircraft, the engine installation including:
an engine; and
an exhaust system operatively coupled to the engine, the exhaust system including:
an inner nozzle to exhaust a core exhaust flow from the engine, and
an outer nozzle disposed about the inner nozzle to exhaust a secondary exhaust flow from the engine, the outer nozzle having a variable portion to vary an exit aperture of the outer nozzle from a first shape to a second shape to change a flowfield shape of at least a portion of the outer nozzle flowfield proximate the wing assembly to reduce at least one of drag and thermal loading on the wing assembly in comparison with the variable portion operating in the first shape, the exit area of the first shape substantially equal to the exit area of the second shape.

2. The system of claim 1, wherein the variable portion of the outer nozzle is configured to provide a non-circular exit aperture having at least one of a flattened upper portion, a flattened tower portion, and an approximately elliptical exit aperture.

3. The system of claim 1, wherein the outer nozzle includes a plurality of flaps to vary the exit aperture of the outer nozzle from the first shape to the second shape.

4. The system of claim 1, wherein the inner nozzle comprises an axisymmetric inner nozzle.

5. The system of claim 1, wherein the second shape includes at least one of a flattened upper portion, a flattened lower portion, and an approximately elliptical exit aperture.

6. The system of claim 1, wherein the engine comprises a turbofan engine.

7. An aircraft, comprising:
a fuselage;
a wing assembly operatively coupled to the fuselage; and
an engine installation coupled to the wing assembly, the engine installation including:
an engine; and
an exhaust system operatively coupled to the engine, the exhaust system having at least one nozzle configured to exhaust an exhaust flow from the engine, wherein the at least one nozzle includes a variable portion to vary an exit aperture of the at least one nozzle from a first shape to a second shape to generate a non-axisymmetric flowfield shape proximate the wing assembly to reduce at least one of drag and thermal loading on the wing assembly in comparison with the variable portion operating in the first shape.

8. The aircraft of claim 7, wherein the variable portion of the at least one nozzle is configured to provide a non-circular exit aperture having at least one of a flattened upper portion, a flattened lower portion, and an approximately elliptical exit aperture.

9. The aircraft of claim 7, wherein the exhaust system has an inner nozzle configured to exhaust a core exhaust flow from the engine, and an outer nozzle disposed about the inner nozzle and configured to exhaust a secondary exhaust flow from the engine, wherein the outer nozzle includes the variable portion configured to vary an outer exit aperture of the outer nozzle.

10. The aircraft of claim 9, wherein the inner nozzle comprises an axisymmetric inner nozzle.

11. The aircraft of claim 10, wherein the second shape includes at least one of a flattened upper portion, a flattened lower portion, and an approximately elliptical exit aperture.

12. The aircraft of claim 9, wherein the engine comprises a turbofan engine.

* * * * *